United States Patent [19]

Bunch

[11] Patent Number: 5,733,464

[45] Date of Patent: Mar. 31, 1998

[54] METHOD AND APPARATUS FOR THE MECHANICAL FILTRATION OF POND WATER

[75] Inventor: G. W. Bunch, Aloha, Oreg.

[73] Assignee: Clearwater Fish & Pond Supply, Inc., Aloha, Oreg.

[21] Appl. No.: 538,632

[22] Filed: Oct. 4, 1995

[51] Int. Cl.⁶ ............................................ B01D 24/46
[52] U.S. Cl. .................... 210/791; 210/143; 210/411; 210/483; 119/215
[58] Field of Search ..................... 210/169, 143, 210/791, 797, 798, 483, 411, 503, 412; 119/215

[56] References Cited

U.S. PATENT DOCUMENTS

| 336,089 | 2/1886 | Chamberland .................... 210/413 |
|---|---|---|
| 3,168,467 | 2/1965 | Dreyer . |
| 3,367,506 | 2/1968 | Rosaen . |
| 3,379,312 | 4/1968 | Brown . |
| 3,872,008 | 3/1975 | Lee et al. ..................... 210/232 |
| 4,284,500 | 8/1981 | Keck . |
| 4,358,371 | 11/1982 | Jameson et al. . |
| 4,762,615 | 8/1988 | Drori . |
| 4,859,335 | 8/1989 | Whyte . |
| 5,106,500 | 4/1992 | Hembree et al. . |
| 5,164,079 | 11/1992 | Klein ........................... 210/411 |
| 5,198,111 | 3/1993 | Davis . |

OTHER PUBLICATIONS

"Aquarium Filtration Has Been Taken by Storm . . . Sea Storm by Ocean Nutrition," brochure, 2 pp.

*Primary Examiner*—Robert Popovics
*Attorney, Agent, or Firm*—Klarquist Sparkman Campbell Leigh & Whinston, LLP

[57] ABSTRACT

A pond filtration device for filtering impurities from pond water and a backflush system for cleaning the filtration device. The illustrated embodiment includes a watertight body with a filter cage mounted longitudinally therein. A filter medium, such as burlap, encloses the filter cage and uses impurities filtered from the pond water as a natural filter to further filter the pond water. After the filter is full of impurities, the backflush system cleans the filter and removes the impurities from the watertight body. The backflush system includes a backflush member threadably mounted to a rotatable screw shaft. The backflush member projects water radially through the filter cage and filter medium to clean impurities therefrom.

19 Claims, 3 Drawing Sheets

5,733,464

METHOD AND APPARATUS FOR THE MECHANICAL FILTRATION OF POND WATER

FIELD OF THE INVENTION

This invention relates generally to mechanical filtration and particularly to a self cleaning mechanical filter specially adapted for the filtration of pond water.

BACKGROUND OF THE INVENTION

Fresh water ponds located on both residential and commercial properties are becoming increasingly popular throughout the world for raising fish. Gravel usually lines the bottom of the pond serving as a filter to catch excess fish food and waste. Additionally, the gravel reflects light making it easier to watch and enjoy the fish. Algae, however, usually builds up on the water's surface and gravel bottom giving the pond an undesirable green appearance and reducing the reflective index of the gravel. Additionally, leaves, sticks and other floating debris might accumulate on the pond surface making it difficult to see the fish.

In order to remove such debris, mechanical filters are used which pass the water through a sieve trapping suspended particulars while allowing clean water to freely pass. One such prior art mechanical filter forces pond water through several feet of gravel, which operates as the filter medium. Cleaning this filter is an onerous task requiring backflush water at a pressure of 80 to 100 PSI (obtained from a fire hydrant) to be projected through the gravel in order to adequately remove the debris. Even then, it takes a large amount of time to remove all the debris embedded in the gravel.

Most filters used for fish aquariums are biological filters, which aid in the biological breakdown of nitrogenous toxins produced during organic processes. As fish eat and breathe, they expel ammonia as a by-product of life processes. Additionally, excess uneaten food and decaying matter such as decomposing plants also add to ammonia build up.

Biological filters work by growing several bacterial strings which breakdown ammonia and convert it to less harmful nitrates. Usually, six weeks are needed to produce sufficient bacteria to fully breakdown the ammonia in the fish pond. Because cleaning the filter kills the beneficial bacteria, the biological filter needs to be left untouched for extended periods of time. Once cleaned, the six week cycle to produce sufficient bacteria must start over again.

Typical biological filters claim to be a combined biological and mechanical filter, yet in reality they are primarily biological filters. Usually these filters have a foam pad lying on top of gravel or bacteria growing medium, all enclosed in a watertight box. The water to be filtered is sprayed into the top of the box, travels through the foam and gravel and is drawn from the bottom of the watertight box and pumped back into the pond. For biological filtration, these devices work adequately if left for sufficient periods of time allowing for bacterial growth. When large amounts of algae, leaves and debris are in the pond, however, the mechanical filtration properties of the filter prove inadequate. Specifically, algae quickly fills the pores in the foam pads and clogs the filter, usually within an hour. The algae is then very difficult to remove from the filter and usually requires scrubbing the foam in order to properly clean it. Additionally, because the filter needs to be cleaned every hour, the desired bacteria are unable to grow.

Filters from other disciplines are also not adaptable for the mechanical filtration of fish ponds. For example, Keck, U.S. Pat. No. 4,284,500 discloses a filter screen within a hollow body used in the commercial production of polyvinyl chloride. Fluid passes through the filter screen separating any oversized particulars from the fluid. A washer is used to backflush the filter screen to remove excess particulars lodged in the screen during filtration. Such a device would not work, however, as a pond filter because algae forced under pressure through small holes in the filter screen would be lodged therein causing the filter to quickly clog. Additionally, algae lodged in the filter screen would be very difficult to remove.

Accordingly, there is a need for a filtration device which allows for the removal of algae, leaves and other debris from a fish pond which is capable of running for extending periods of time without clogging and which can be easily cleaned.

SUMMARY OF THE INVENTION

The present invention is a self-cleaning mechanical pond water filter which can filter large volumes of algae, leaves, and other debris from a pond. Rather than clogging because of algae accumulation, the filter uses the algae and other debris as an additional filtration medium. The invention also provides a quick, simple, and convenient backflush system for cleaning such debris from the filter.

In a preferred embodiment of the invention, a watertight body, such as a cylindrical metal drum, includes a pond water inlet line for receiving water from the pond and an outlet line for returning filtered water to the pond. A filter cage made from metal wire is mounted coaxially within the watertight body and positioned so that pond water passes from the inlet line through the filter cage to the outlet line. A fibrous material, such as burlap, surrounds the filter cage and acts as the filtering device to filter algae, leaves, and other debris from the pond water. As debris accumulates on the fibrous material, pond water is forced to pass through the debris. Thus, the debris acts as a natural filter working in conjunction with the fibrous material to filter the pond water.

The preferred embodiment also includes a backflush system allowing the filter to be cleaned when the watertight body is filled with debris. The backflush system includes a screw shaft extending longitudinally within the filter cage for the length of the watertight body and a threaded backflush member mounted on the screw shaft. The backflush member is similar to two dishes placed face-to-face and separated by a compression spring so that a gap is formed therebetween. Water is injected into the gap by a backflush inlet pipe and the water is radially projected from the backflush member perpendicularly through the filter cage to remove debris accumulated on the fibrous material.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

Figure 1:
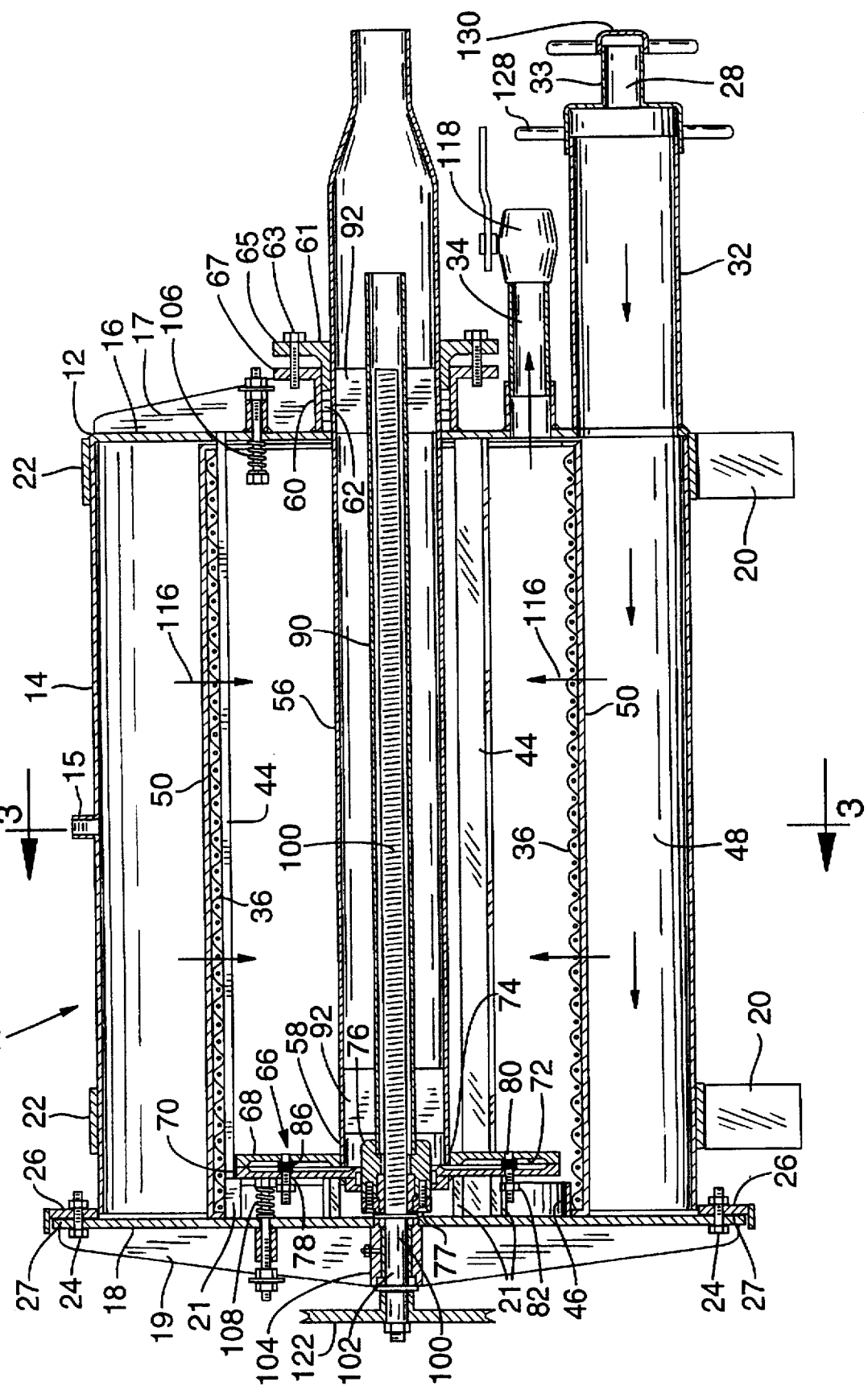
FIG. 1 is a cross-sectional view of a pond filtration device constructed in accordance with the present invention shown in filtration mode with arrows indicating the direction of water flow.

Referring to the drawings, FIG. 1 shows a mechanical pond filtration device of the present invention for cleaning impurities such as algae, leaves, sticks and other floating debris from a pond. The device can be of a size as to be loaded in a truck or van to be transported between separate pond locations or can be permanently situated near a single pond. As will be further described below, pond water to be cleaned is pumped through a hose to the mechanical filter, filtered and returned to the pond through a second hose.

Figure 3:
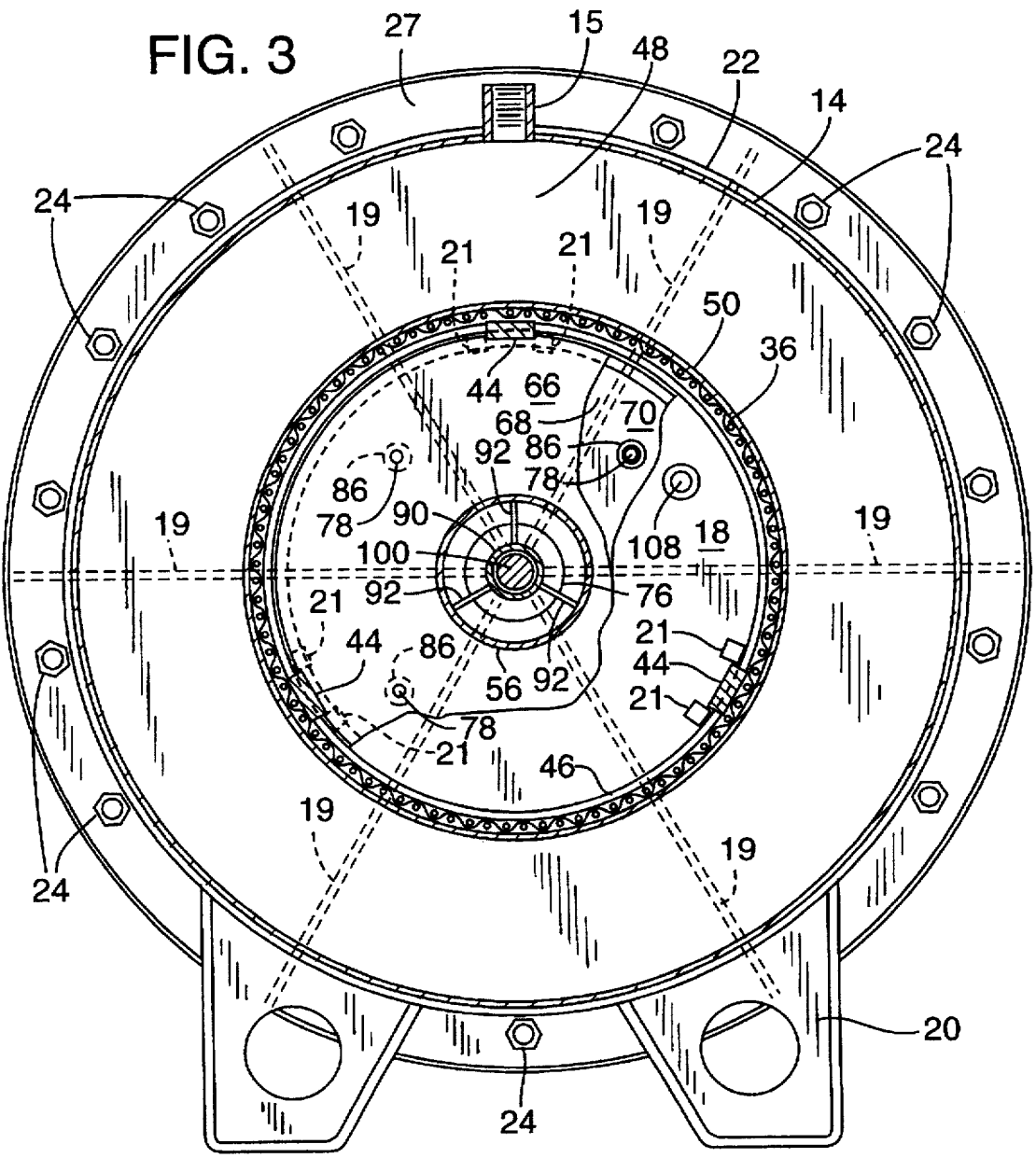
FIG. 3 is an enlarged cross-sectional view of the pond filtration device shown in FIG. 2 taken along line 3—3.

The mechanical filter 10 includes a hollow watertight tank or body 12 having a cylindrical outer wall 14 and opposed planar end walls 16, 18. The tank 12 has a longitudinal axis extending horizontally between the end walls 16, 18, and is supported by legs 20 extending outwardly from the tank bottom, the legs being secured to the tank by straps 22. A series of strengthening flanges 17 project outwardly from end wall 16 and extend radially from substantially near the center of end wall 16 in a star-like pattern. An opposed series of strengthening flanges 19 project outwardly from end wall 18 similar to flanges 17 as is shown in FIG. 3. Six square stops 21 project inwardly from end wall 18 paired in three groups of two and forming an inner circle concentrically aligned with end wall 18. The end wall 18 is removably secured in place by bolts 24 which extend through flange 26 extending outwardly from the wall 14 around the circumference of tank 12. Gasket 27 seals the tank 12 when the end wall 18 is secured to the tank. The end wall 16 is welded to the tank 14.

An inlet line 32 is attached near the bottom of wall 16 and extends outwardly therefrom in a horizontal direction. The inlet line 32 contains a threaded adapter 28 that can be removed to allow connection of a hose directly to the inlet line or, alternatively, to the adapter nipple 33 if a smaller hose is desired. An outlet line 34 is also attached to wall 16 below the center of the wall and above inlet line 32 and extends outwardly and horizontally therefrom. Inlet line 32 preferably has a greater diameter than outlet line 34 allowing water pressure to be maintained within the tank 12 while in filtration mode as will be further described.

A cylindrical cage 36 is coaxially mounted in the tank 12 and supported by three elongated bars 44 spaced equidistant from each other around the inside of the circumference of the cage 36. The bars 44 are welded to the end wall 16 and extend to the opposed wall 18 where each bar is supported by a pair of the stops 21. The bars have an outer recess through which a ring 46 extends so as to encircle the bars. The cage 36 encircles the bars 44 and is slidably supported by the bars to allow removal and replacement of the cage, as will be further described.

Filter cage 36 comprises a cylindrical wire mesh screen extending the length of tank 12 and is of a lesser diameter than tank wall 14 to define a flow space 48 therebetween. A filter medium comprising a fibrous material 50 surrounds filter cage 36 and extends from end wall 16 to end wall 18. Filter cage 36, thus, acts as a support for fibrous material 50, which is the primary filter medium in mechanical filter 10.

Fibrous material 50 is preferably burlap which effectively strains algae, leaves and other impurities from the pond water during operation of the filter. As these impurities build up on fibrous material 50, the impurities act as a natural filter through which pond water travels and is further filtered. Thus, fibrous material 50 has the characteristics of not clogging when algae-filled pond water passes through it, but instead uses the algae as a further filter medium. Burlap satisfies these characteristics since it does not unduly compress under the weight of the impurities or the pressure of the water being pumped through the filter.

Filter cage 36 and fibrous material 50 are positioned within tank 12 between inlet line 32 and outlet line 34 so that water passes from the inlet line through the filter cage to the outlet line. Specifically, inlet line 32 extends through end wall 16 aligned with the flow space 48 outside of cage 36. Outlet line 34 extends through wall 16 and is aligned to drain filtered water from within cage 36.

When impurities from the pond water accumulate on the fibrous material 50 such that the back pressure exceeds a predetermined level, the backflush system of the invention may be used to remove such impurities from the filter. The backflush system includes a backflush inlet pipe 56 slidably and coaxially supported by and extending through the center of the first end wall 16 of tank 12. Backflush pipe 56 is of a length so that it can extend along the longitudinal axis of tank 12 allowing the inner end 58 of the backflush inlet pipe to be substantially near end wall 18 of a mechanical filter 10 when the pipe 56 is fully inserted into the tank. Backflush inlet pipe 56 is shown, in FIG. 1, cantilevered within tank 12 and fully extended into the tank. The backflush pipe 56 is slidably supported within a suitable flanged packing gland 60 into which a packing gland follower 61 is positioned encircling the pipe 56. Bolts 63 extend through flange 65 on the packing gland follower 61 and a flange 67 on the packing gland so that the follower may be compressed against the tank wall 16 to maintain packing 62 in place to create a water tight seal around the pipe 56.

The backflush system also includes backflush member 66 comprising a recessed back plate 68 and a recessed front plate 70, the plates being similar to two recessed dishes mounted face-to-face defining a void 72 therebetween. Back plate 68 has a centrally located hole 74 therein through which the end 58 of backflush inlet pipe 56 extends, the plate being welded to the pipe. Backflush inlet pipe 56 is, thus, in open communication with backflush member 66 so that water can pass from the backflush pipe into void 72. Front plate 70 has a centrally located aperture with a housing 76 mounted therein for supporting a nut 77 coaxially mounted within tank 12. The front plate 70 also has openings 78 therethrough. Studs 80 welded to the back plate 68 extend through the openings 78 and receive nuts 82 to hold front plate 70 in fixed relation to back plate 68. Compression springs 86 are mounted on the studs 80 between front plate 70 and back plate 68 to bias front plate 70 and back plate 68 apart to provide peripheral gap 88 (see FIG. 2) between the back plate and the front plate that allows water to pass from the backflush inlet pipe 56 into the tank 12. Holding nuts 82 can function as a gap adjuster by tightening or loosening the nuts to change the width of peripheral gap 88. Backflush member 66 has three notches in the peripheral edge through which the bars 44 extend to prevent rotation of the backflush member as is best seen in FIG. 3.

Coaxially mounted in the backflush inlet pipe 56 is a tube 90 (see FIG. 1). The tube 90 is supported at one end to housing 76, and extends within backflush inlet pipe 56 and is supported by three angularly spaced guides 92 at the opposed end of the inlet pipe. Guides 92 are plate-like and extend inwardly from the backflush inlet pipe 56 to the tube 90, their spacing allowing backflush water to pass through backflush inlet pipe 56 to backflush member 66, as can be more clearly seen in FIG. 3.

The nut 77 receives a cooperatively threaded shaft 100, which extends coaxially into the tube 90 from an unthreaded shank 102, which is supported in a thrust bearing 104 mounted in end wall 18. A portion of the shank 102 extends outwardly from the bearing 104 and is adapted to support a pulley 122 or other suitable drive means so that the shaft 100 can be rotated by a suitable motor. Rotation of the screw shaft 100 causes the backflush member 66 to move in or out with respect to the tank 12, depending upon the direction of rotation of the shaft 100.

Figure 2:
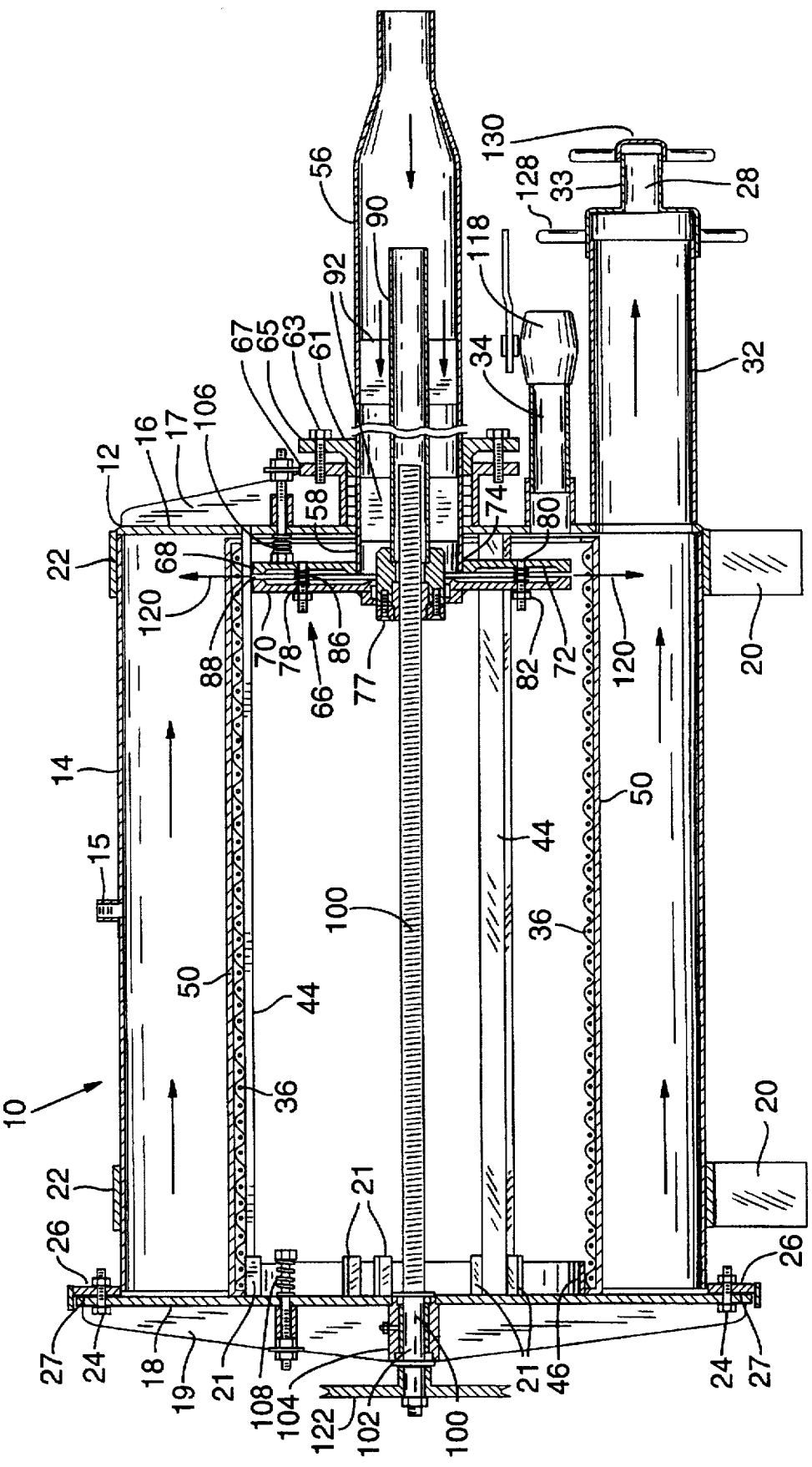
FIG. 2 is a view of the pond filtration device of FIG. 1 in backflush mode with arrows indicating the direction of water flow.

A reverse switch operator 106 mounted in end wall 16 comprises an elongated shaft with one end extending horizontally into tank 12 and the opposed end connected to a suitable switch (not shown) for connection to the motor (not shown) driving the shaft 100 so as to effect automatic reversal of the motor after the backflush member has traversed the tank from its original position shown in FIG. 1, to the position shown in FIG. 2. A stop switch operator 108 extends through end wall 18, with one end extending into tank 12 and the opposed end connected to the driving motor switch (not shown) to cause it to stop at the end of a back flush cycle.

The filtering operation of mechanical filter 10 is best shown in FIG. 1 with arrows 116 indicating the direction of water flow. Hoses (not shown) are attached to inlet line 32 and outlet line 34. The hose attached to the outlet line 34 runs directly to the pond. The hose attached to inlet line 32 is connected to a pump (not shown) which pumps water from the pond to mechanical filter 10. Threaded adapter 28 is removed from inlet line 32 by using handles 128 in order to attach the hose allowing pond water to pass through inlet line 32 and into flow space 48 of mechanical filter 10. A bleed valve (not shown) attached to coupling 15 at the top of the tank may be used to release air from within the tank as it fills with water. After tank 12 is filled with pond water, a valve 118 in outlet line 34 is opened so that water passes through fibrous material 50 and filter cage 36 as shown by arrows 116. Because inlet line 32 has a greater diameter than outlet line 34, water pressure will be maintained within the tank 12 so that filtered water will drain through outlet line 34 back to the pond without requiring a pump.

Impurities from the pond water build on fibrous material 50 as the water passes through it. Pond water subsequently pumped into the mechanical filter 10 must not only pass through fibrous material 50, but also impurities previously filtered. Thus, the filtering capability of the mechanical filter 10 increases as impurities build to form a natural filter.

When impurities from the pond water accumulate to a desired depth on the filter medium, the backflush system of the invention may be used to remove such impurities from the tank 12.

FIG. 2 shows the mechanical filter 10 in backflush mode with arrows 120 indicating the direction of water flow. To enter backflush mode, valve 118 of outlet line 34 is closed. Pipe cap 130 is removed and a hose is attached to the threaded adapter 28. Additionally, the hose (not shown) connected to inlet line 32 is routed to a discharge area into which the backflush water will be deposited. A motor (not shown) drives belt pulley 122 to rotate screw shaft 100. Backwash water from a suitable source is passed through backflush inlet pipe 56 into backflush member 66. The backwash water then passes through peripheral gap 88 in backflush member 66 and projects radially and perpendicularly through filter cage 36 and fibrous material 50 as shown by arrows 120. The radially projecting water will remove the collected debris from the fibrous material 50 and the debris will pass through line 32 to be discarded.

As the screw shaft rotates within nut 77, the non-rotatable backflush inlet pipe 56 moves with backflush member 66 from adjacent end wall 18 of tank 12 towards the opposed end wall 16. Thus, backflush member 66 and backflush inlet pipe 56 will move within tank 12 from the fully extended position in FIG. 1 to the position shown in FIG. 2.

Upon reaching the position shown in FIG. 2, backflush member 66 will contact automatic reverse switch operator 106 causing the motor to reverse rotate belt drive pulley 122 and consequently screw shaft 100. The reverse rotation will cause backflush member 66 and backflush inlet pipe 56 to move within tank 12 to the original position as shown in FIG. 1. When this position is reached, stops 21 will close the peripheral gap 88 as the backflush member 66 continues its motion until it effects operation of stop switch operator 108 to turn off the motor.

If further cleaning is desired, end wall 18 may be removed by removing the bolts 24. Once end wall 18 is opened, filter cage 36 and fibrous material 50 may be removed from tank 12 for further cleaning or replacement or repair. When filter cage 36 and fibrous material 50 are reinserted into tank 12, the bars 44 guide the cage back into position.

Having described and illustrated the principles of my invention with reference to preferred embodiments thereof, it will be apparent that these embodiments can be modified in arrangement and detail without departing from the principles of the invention.

For example, although the filter cage and fibrous material were shown coaxially positioned within the tank, they may be positioned anywhere within the tank so long as water passes from the inlet line through the filter cage and fibrous material to the outlet line.

Additionally, although the tank was shown as cylindrical, any shape utilizing the principles disclosed herein can be used.

Furthermore, while the fibrous material is preferably burlap, other fibrous materials may be used. For example, fiberglass or any thread-like medium can be employed.

Finally, while the backflush member was shown as two plates held together by springs, bolts and nuts, any configuration which projects water through the filter cage may be used.

In view of the many possible embodiments to which the principles of my invention may be applied, it should be recognized that the illustrated embodiment is only a preferred example of the invention and should not be taken as a limitation on the scope of the invention. Rather, the scope of the invention is defined by the following claims. I therefore claim as my invention all that comes within the scope and spirit of these claims.

I claim:

1. A pond filtration device for filtering impurities from pond water comprising:

a hollow, watertight body having an outer wall, opposed first and second end walls, a pond water inlet and a filtered water outlet, said body having a longitudinal axis extending between said end walls;

a filter cage having first and second ends, the filter cage mounted within said watertight body and positioned so that pond water passes from said inlet through said filter cage to said outlet;

a fibrous material surrounding and supported by said filter cage and extending from said first end of said filter cage to said second end of said filter cage, said fibrous material being operable to filter impurities from said pond water;

a backflush inlet pipe coupled to said first end wall of said watertight body and having an interior space through which water can travel;

a backflush member mounted in said cage and coupled to and in fluid communication with said backflush inlet pipe for allowing the passage of water from said backflush inlet pipe to said backflush member, said backflush member being operable to project water radially through said fibrous material; and a rotatable screw shaft coaxially positioned within said watertight body and having a first end supported by said second end wall of said watertight body and a second end extending into said interior space of said backflush inlet pipe for effecting axial movement of said backflush member to backflush said fibrous material.

2. The pond filtration device of claim 1 wherein said watertight body is a cylindrical tank.

3. The pond filtration device of claim 1 wherein said inlet has a greater diameter than said outlet.

4. The pond filtration device of claim 1 wherein said filter cage is coaxially mounted within said watertight body.

5. The pond filtration device of claim 1 wherein said filter cage includes a cylindrical wire mesh screen to support said fibrous material.

6. The pond filtration device of claim 1 wherein said filter cage is a cylindrical wire mesh screen extending between said end walls of said watertight body and defining a flow space between said outer wall of said watertight body and said filter cage, and wherein said inlet is connected to one end of said watertight body and positioned so that water passing through said inlet enters said flow space within said watertight body.

7. The pond filtration device of claim 6 wherein said outlet is connected to one end of said watertight body and positioned within said filter cage.

8. The pond filtration device of claim 1 wherein said fibrous material is burlap.

9. The pond filtration device of claim 1 wherein said fibrous material is fiberglass.

10. The pond filtration device of claim 1 wherein said backflush inlet pipe is slidably and coaxially mounted to one end wall of said watertight body.

11. The pond filtration device of claim 1 wherein said backflush member defines a peripheral gap therein having a width for projecting water radially therefrom and the backflush member being adjustable to change the width of the peripheral gap.

12. The pond filtration device of claim 1 wherein said backflush inlet pipe includes a first end and wherein said backflush member further includes a front and back plate forming a peripheral gap therebetween, said back plate having centrally located hole through which said backflush inlet pipe extends.

13. The pond filtration device of claim 1 wherein said backflush member includes a nut coaxially mounted therein receiving said rotatable screw shaft.

14. The pond filtration device of claim 1 further including an automatic reverse switch operator and a stop switch operator, said automatic reverse switch operator mounted to one end of said watertight body and said stop switch operator mounted to the opposed end of said watertight body.

15. A backflush system for cleaning impurities collected in a pond filtration device comprising:

a watertight body having an outer wall, opposed first and second end walls, a pond water inlet and a pond water outlet, said watertight body having a longitudinal axis extending between said end walls;

a cylindrical filter mounted within said watertight body;

a backflush inlet pipe extending into said body through one of said end walls;

a backflush member having a peripheral gap therein, said backflush member coupled to and in fluid communication with the inner end of said backflush inlet pipe so that water can pass from said backflush inlet pipe to said backflush member and be projected radially through said peripheral gap in said backflush member and through said filter;

a shaft longitudinally positioned within said watertight body and operatively connected to said backflush member for effecting movement of said backflush member along said longitudinal axis of said watertight body;

wherein said backflush member comprises a front and a back plate defining a peripheral gap, and a gap adjusting means operatively arranged between said plates for modifying the width of said flap therebetween;

wherein said back plate has studs attached thereto, and said front plate has apertures through which said studs slidably extend, and means for retaining said front plate on said studs; and wherein said flap adjuster comprises compression springs mounted on said studs between said front and back plates to bias said front plate and said back plate apart, and holding nuts mounted to said studs to retain said front plate on said studs.

16. The backflush system of claim 15 wherein said shaft is a rotatable screw shaft extending within said backflush inlet pipe.

17. The backflush system of claim 15 further including an automatic reverse switch operator and a stop switch operator, said automatic reverse switch operator mounted to one end wall of said watertight body and said stop switch operator mounted to said opposed end wall of said watertight body.

18. A method of cleaning pond water comprising the steps:

pumping pond water into an inlet in a tank, through a cylindrical fibrous filter material mounted within said tank, and out an outlet in said tank, said filter material positioned between said inlet and outlet for allowing impurities within said pond water to accumulate on said fibrous material, said tank having an outer wall and opposed first and second end walls;

pumping water to a backflush member having a peripheral gap therein, said backflush member positioned within said cylindrical fibrous material so that water projects radially from said peripheral gap through said fibrous filter material;

rotating a shaft coupled to said backflush member, said shaft extending from said first end wall of said tank to said second end wall for moving said backflush member within said tank, said shaft rotating until said backflush member reaches said first end of said tank; and automatically reverse rotating said shaft until said backflush member reaches said second end wall of said tank.

19. A self-cleaning mechanical pond water filtration device for removing impurities from the water, the filtration device comprising:

a watertight body having a cylindrical outer wall and opposed first and second end walls, said watertight body having a longitudinal axis extending from said first end wall to said second end wall;

a guide bar extending inwardly between the ends of the watertight body;

a cylindrical filter cage of lesser diameter than said outer wall and supported by said bar, said filter cage extending coaxially within said watertight body and defining a flow space between said filter cage and said outer wall of said watertight body;

a fibrous material surrounding said filter cage extending from said first end to said second end of said filter cage;

a pond water inlet in one of said end walls of said watertight body positioned so that water passing through said inlet enters said flow space within said watertight body;

an outlet in one of said end walls and positioned to receive water from the interior of said filter cage;

a backflush inlet pipe slidably and coaxially mounted in one of said end walls of the watertight body, said backflush pipe having a first end positioned within said body and a second end positioned outside of said body;

an elongate, rotatable screw shaft coaxially mounted within said watertight body having one end extending through one of the end walls of said watertight body; and a backflush member having a front and a back plate defining a peripheral gap therebetween, said back plate having a centrally located hole through which said backflush inlet pipe extends, said back plate being fixed to said pipe, said back plate having studs mounted thereto, the studs having a compression spring mounted thereon, said front plate having apertures for slidably engaging said studs, a plurality of holding nuts one on each of said studs to hold said front plate on said studs, said compression springs engaging between said front plate and said back plate to urge them apart, wherein adjustment of said holding nuts is operable to change the width of said peripheral gap between said front and back plates and wherein rotation of said screw shaft moves said backflush member longitudinal of said body to effect backwashing of said fibrous material.

* * * * *

UNITED STATES PATENT AND TRADEMARK OFFICE
CERTIFICATE OF CORRECTION

PATENT NO.: 5,733,464

DATED: March 31, 1998

INVENTOR(S): G. W. Bunch

It is certified that error appears in the above-identified patent and that said Letters Patent is hereby corrected as shown below:

Column 8, line 19: "flap" should be --gap--.

Column 8, line 24: "flap" should be --gap--.

Signed and Sealed this

Ninth Day of March, 1999

Attest:

Q. TODD DICKINSON

*Attesting Officer*  *Acting Commissioner of Patents and Trademarks*